US012620791B2

(12) United States Patent (10) Patent No.: US 12,620,791 B2
Kobayashi et al. (45) Date of Patent: May 5, 2026

(54) ELECTRICAL CONNECTION BOX AND WIRE HARNESS

(71) Applicant: YAZAKI CORPORATION, Tokyo (JP)

(72) Inventors: Kazuki Kobayashi, Kakegawa (JP); Naoya Akiyama, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 318 days.

(21) Appl. No.: 18/401,233

(22) Filed: Dec. 29, 2023

(65) Prior Publication Data

US 2024/0243563 A1 Jul. 18, 2024

(30) Foreign Application Priority Data

Jan. 16, 2023 (JP) ................................. 2023-004268

(51) Int. Cl.
*H02G 3/08* (2006.01)
*B60R 16/02* (2006.01)
*B60R 16/023* (2006.01)
*H02G 3/16* (2006.01)

(52) U.S. Cl.
CPC ......... *H02G 3/081* (2013.01); *B60R 16/0207* (2013.01); *B60R 16/0238* (2013.01); *H02G 3/16* (2013.01)

(58) Field of Classification Search
CPC . H02G 3/081; H02G 3/16; H02G 3/08; B60R 16/0207; B60R 16/0238; B60R 16/0239; H01R 4/34; H01R 25/162; H01R 25/14; H01R 13/514; H01R 9/2458; H01R 2201/26
See application file for complete search history.

(56) References Cited

U.S. PATENT DOCUMENTS

| | | | |
|---|---|---|---|
| 10,879,683 B1 | 12/2020 | Kanemitsu et al. | |
| 2001/0036773 A1* | 11/2001 | Suzuki | H01R 13/6215 |
| | | | 439/701 |
| 2002/0166690 A1* | 11/2002 | Chiriku | H05K 1/0201 |
| | | | 174/60 |
| 2003/0231482 A1* | 12/2003 | Naimi | B60R 16/0238 |
| | | | 361/833 |
| 2010/0105223 A1* | 4/2010 | Taguchi | H01R 4/34 |
| | | | 439/76.2 |
| 2022/0224094 A1* | 7/2022 | Sato | H02G 5/02 |

FOREIGN PATENT DOCUMENTS

JP 2021-35188 A 3/2021

* cited by examiner

*Primary Examiner* — Edwin A. Leon
(74) *Attorney, Agent, or Firm* — KENEALY VAIDYA LLP

(57) ABSTRACT

An electrical connection box includes a housing configured by a lower cover and an upper cover, a busbar, a first relay, and a second relay. The lower cover includes a busbar placed portion where the busbar is placed on one side in a stacking direction and a first relay mounted portion where the first relay is mounted on the one side in the stacking direction. The upper cover includes a second relay mounted portion that covers the one side in the stacking direction of the busbar placed on the busbar placed portion, that mounts the second relay on the one side in the stacking direction, and that is provided with an opening, and a cover portion covering the first relay and a bolt.

4 Claims, 6 Drawing Sheets

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2023-004268 filed in Japan on Jan. 16, 2023.

BACKGROUND OF THE INVENTION

1. Field of the Invention

The present invention relates to an electrical connection box and a wire harness.

2. Description of the Related Art

As a conventional technique relating to an electrical connection box, for example, Japanese Patent Application Laid-open No. 2021-35188 discloses an electrical connection box including a housing configured by a base plate where a plurality of electronic components, such as a relay, are mounted, a lower cover covering the bottom surface side of the base plate, and an upper cover covering the top surface side of the base plate.

The aforementioned electrical connection box described in Japanese Patent Application Laid-open No. 2021-35188 leaves room for further improvement in reduction in the number of components, for example.

SUMMARY OF THE INVENTION

In light of the foregoing, an object of the present invention is to provide an electrical connection box and a wire harness that can reduce the number of components.

In order to achieve the above mentioned object, an electrical connection box according to one aspect of the present invention includes a housing configured by a lower cover and an upper cover stacked in a stacking direction; a busbar assembled to the housing and having conductivity; a first relay fastened to the busbar via a bolt and configured to be electrically connected to the busbar; and a second relay including a tab terminal protruding from a body, the tab terminal being configured to be electrically connected to the busbar, the lower cover including a busbar placed portion and a first relay mounted portion, the busbar being placed on one side in the stacking direction at the busbar placed portion, the first relay being mounted on the one side in the stacking direction at the first relay mounted portion, and the upper cover including a second relay mounted portion and a cover portion, the second relay mounted portion covering the one side in the stacking direction of the busbar placed on the busbar placed portion, mounting the second relay on the one side in the stacking direction, and being provided with an opening, the tab terminal passing through the opening toward the busbar, the cover portion covering the first relay mounted on the first relay mounted portion and the bolt.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described in detail below with reference to the drawings. Note that the following embodiments should not be construed to limit this invention. Constituents in the following embodiments include constituents that can be readily substituted by those skilled in the art or that are substantially the same. Note that, in this specification, ordinal numbers are used only to distinguish components, members, portions, positions, directions, and the like and do not indicate order or priorities.

Embodiment

Figure 1:
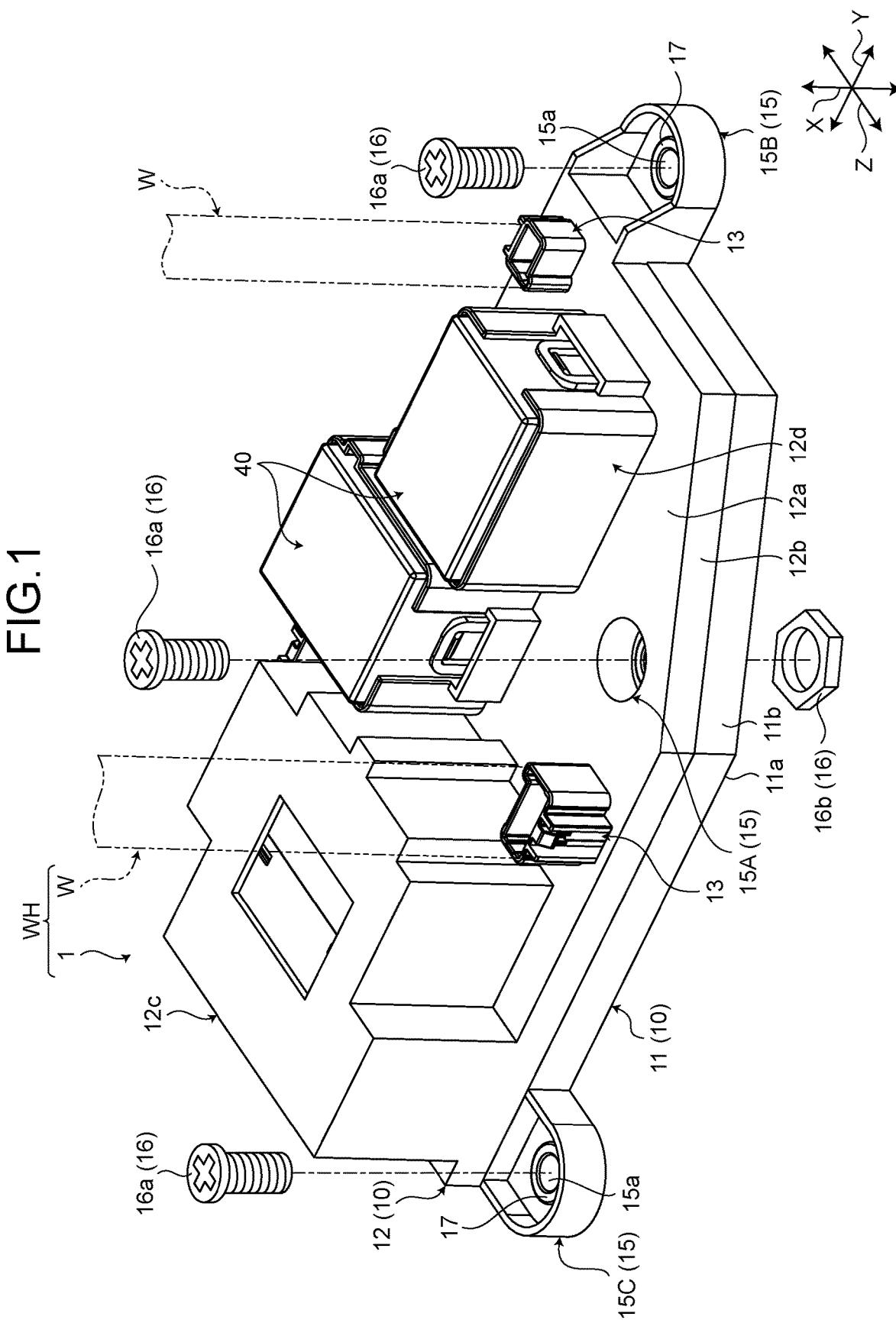
FIG. 1 is a perspective view in which an electrical connection box applied to a wire harness according to an embodiment is exemplified.

FIG. 1 is a perspective view of an electrical connection box 1 applied to a wire harness WH according to an embodiment. The electrical connection box 1 of this embodiment illustrated in FIG. 1 is incorporated into the wire harness WH routed in a vehicle, such as an automobile. Herein, the wire harness WH is, for example, for connecting a plurality of routing materials W bundled together as an assembled component and used for power supply and signal communication to devices mounted in the vehicle by using connectors and the like to connect the devices to each other. The wire harness WH includes, for example, the conductive routing materials W and the electrical connection box 1 electrically connected to the routing materials W.

The routing material W includes, for example, a conductor (core wire) in which a plurality of linear metal strands are twisted together and an insulating sheath covering the outside of the conductor. The electrical connection box 1 includes, for example, a housing 10 for consolidating and accommodating therein a plurality of electronic components, such as connectors 13 and 14 (see FIG. 4), busbars 20, a first relay 30 (see FIG. 2), and second relays 40. The electrical connection box 1 is, for example, assembled to a load part disposed in the vehicle and can allow passage of or interrupt current flowing through the load part. The electrical connection box 1 is also called a relay box, a junction box, and the like. Note that the electrical connection box 1 mayinclude not only these but also a fuse, a control unit, and the like. The wire harness WH may include not only these but also a protector, a grommet, a fixing tool, and the like.

Note that, in the following description, among a first direction, a second direction, and a third direction that intersect with each other, the first direction is referred to as "stacking direction X", the second direction as "width direction Y", and the third direction as "depth direction Z". Herein, the stacking direction X, the width direction Y, and the depth direction Z are substantially orthogonal to each other. The stacking direction X typically corresponds to a stacking direction (up-down direction) of a lower cover 11 and an upper cover 12 of the housing 10 in the electrical connection box 1, an extending direction of the routing materials W connected to the electrical connection box 1, an inserting-removing direction of the connectors 13 and 14 of the electrical connection box 1 and connectors of the routing materials W, an assembling direction (equipping direction) of the second relays 40 relative to a second relay mounted portion 12d, which will be described later, and the like. The width direction Y and the depth direction Z correspond to intersecting directions intersecting with the stacking direction X. Unless otherwise specified, each direction used in the following description is described as a direction with the routing materials W assembled to the electrical connection box 1.

Figure 2:
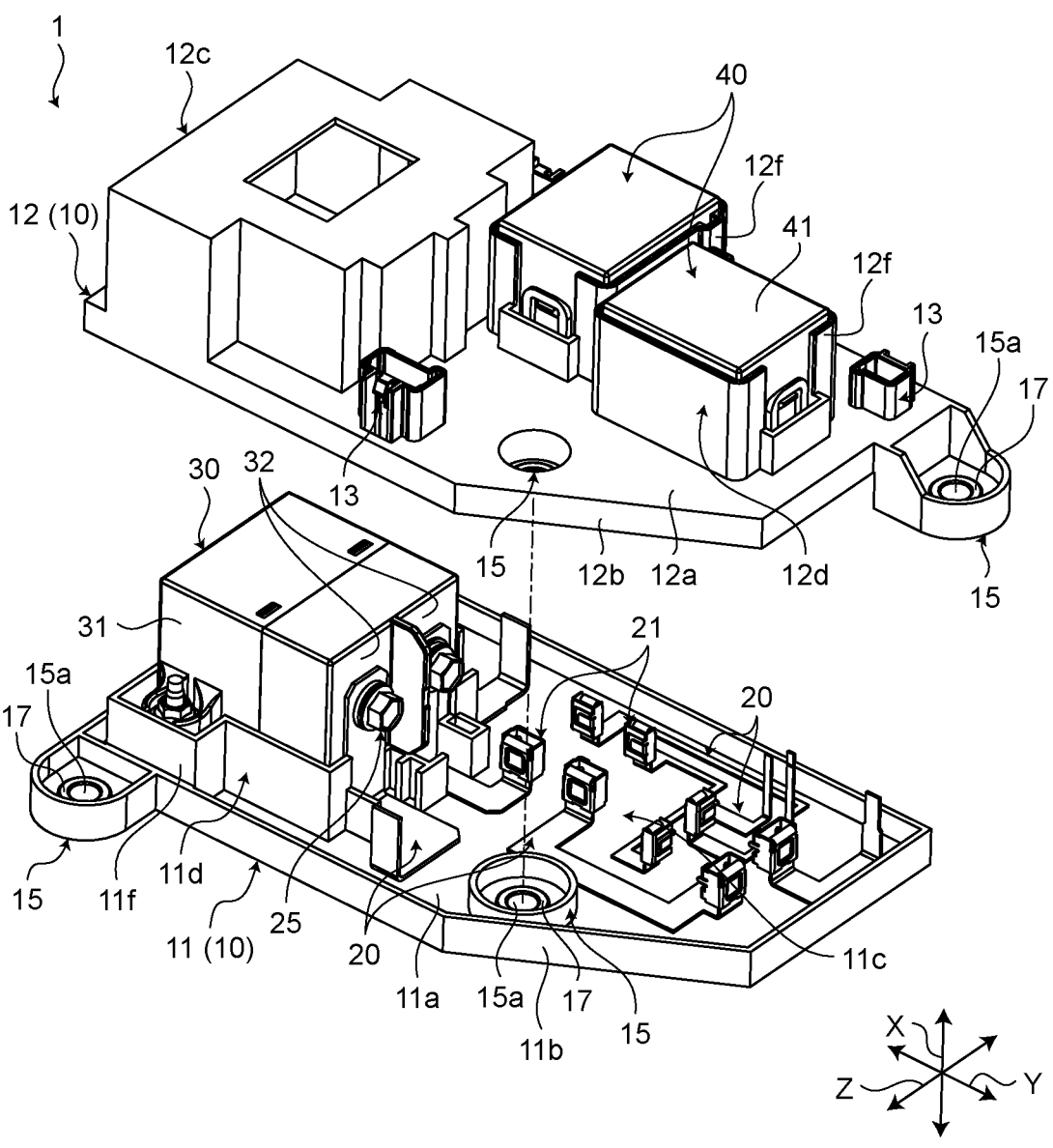
FIG. 2 is an exploded perspective view in which the electrical connection box according to the embodiment is exemplified.

FIG. 2 is an exploded perspective view of the electrical connection box 1. As illustrated in FIG. 2, the housing 10 includes, for example, the lower cover 11 and the upper cover 12 that are formed from an insulating resin material or the like. The upper cover 12 is assembled while being stacked on one side (upper side) in the stacking direction X relative to the lower cover 11. With this configuration, the housing 10 is formed into a hollow box shape as a whole with the lower cover 11 and the upper cover 12 combined. In the housing 10, an inside space defined by the lower cover 11 and the upper cover 12 functions as an accommodating space in which the electronic components, such as the busbars 20, are accommodated.

In specific, the lower cover 11 is formed into a bottomed tube shape (tray shape) with the one side (upper side) in the stacking direction X open and is provided with a busbar placed portion 11c where the busbars 20 are placed on the one side in the stacking direction X and a first relay mounted portion 11d where the first relay 30 is mounted. On the other hand, the upper cover 12 is formed into a bottomed tube shape (tray shape) with the other side (lower side) in the stacking direction X open and is provided with the second relay mounted portion 12d where the second relays 40 are mounted on the one side in the stacking direction X and a cover portion 12c covering the first relay 30.

The second relay mounted portion 12d is provided with openings 12e through which tab terminals 42 (see FIG. 3) of the second relays 40 pass toward the busbars 20, and the cover portion 12c covers, in an integrated manner, bolts 25 fastening terminals 32 of the first relay 30 to the busbars 20. With this configuration, the busbar placed portion 11c and the first relay mounted portion 11d as the above-described accommodating space are formed inside the housing 10, and energized portions (conductors), such as the busbars 20, the terminals 32 of the first relay 30, the bolts 25, and the tab terminals 42 of the second relays 40, are prevented from being exposed to the outside of the housing 10.

The lower cover 11 includes, for example, a bottom wall portion 11a and a peripheral wall portion 11b protruding from the periphery of the bottom wall portion 11a toward the one side in the stacking direction X. The bottom wall portion 11a and the peripheral wall portion 11b are structures for defining the above-described busbar placed portion 11c and first relay mounted portion 11d as the inside space of the housing 10. The busbar placed portion 11c is a space where the busbars 20 are placed, and the first relay mounted portion 11d is a space where the first relay 30 is mounted. In this embodiment, the busbar placed portion 11c is disposed on one side (right side) in the width direction Y relative to the center of the lower cover 11 in the width direction Y, and the first relay mounted portion 11d is disposed on the other side (left side) in the width direction Y relative to the center of the lower cover 11 in the width direction Y.

The first relay mounted portion 11d is provided with a standing wall portion 11f protruding from the bottom wall portion 11a toward the one side in the stacking direction X. The standing wall portion 11f is disposed on the inner side of the peripheral wall portion 11b and is formed into a substantially rectangular shape conforming to a body 31 of the first relay 30. In this embodiment, in the lower cover 11, the first relay mounted portion 11d is surrounded by the bottom wall portion 11a and the standing wall portion 11f, and the busbar placed portion 11c is surrounded by the bottom wall portion 11a and the peripheral wall portion 11b.

The upper cover 12 includes, for example, a top wall portion 12a and a peripheral wall portion 12b protruding from the periphery of the top wall portion 12a toward the other side in the stacking direction X. The top wall portion 12a and the peripheral wall portion 12b are structures for defining, together with the lower cover 11, the above-described busbar placed portion 11c and first relay mounted portion 11d as the inside space of the housing 10. The upper cover 12 is provided with standing wall portions 12f protruding from the top wall portion 12a toward the one side in the stacking direction X. The standing wall portions 12f are structures for defining the above-described second relay mounted portion 12d as an outside space of the housing 10. The second relay mounted portion 12d is a space where the second relays 40 are mounted. The standing wall portions 12f are disposed on the inner side of the peripheral wall portion 12b and are formed into substantially rectangular shapes conforming to bodies 41 of the second relays 40. In this embodiment, in the upper cover 12, the second relay mounted portion 12d is surrounded by the top wall portion 12a and the standing wall portions 12f.

The upper cover 12 is also provided with the cover portion 12c protruding from the top wall portion 12a toward the one side in the stacking direction X. The cover portion 12c is a structure for defining the first relay mounted portion 11d together with the above-described standing wall portion 11f of the lower cover 11. The cover portion 12c is formed into a substantially rectangular shape conforming to the body 31 of the first relay 30. In this embodiment, the cover portion 12c is disposed on the other side (left side) in the width direction Y relative to the center of the upper cover 12 in the width direction Y, and the second relay mounted portion 12d is disposed on the one side (right side) in the width direction Y relative to the center of the upper cover 12 in the width direction Y. The cover portion 12c covers side surfaces and a top surface of the body 31 of the first relay 30.

Figure 3:
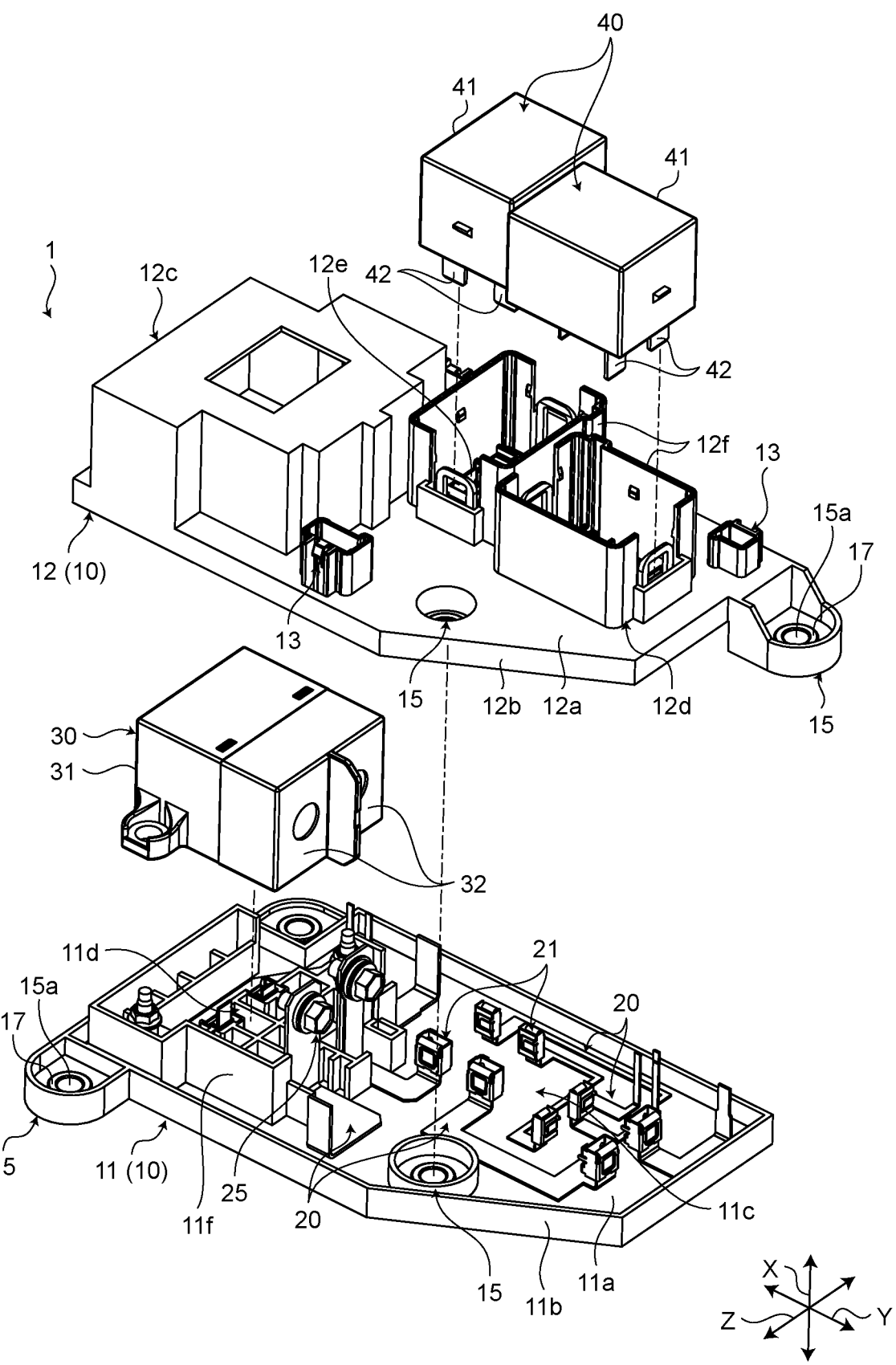
FIG. 3 is an exploded perspective view in which the electrical connection box according to the embodiment is exemplified with a first relay and second relays detached.

FIG. 3 is an exploded perspective view of the electrical connection box 1 with the first relay 30 and the second relays 40 detached. As illustrated in FIG. 3, the first relay 30 and the second relays 40 are, for example, mechanical relays that open and close contacts mechanically by electromagnetic action. In this embodiment, for example, one first relay 30 is disposed on the first relay mounted portion 11d, and two second relays 40 are disposed on the second relay mounted portion 12d. Herein, for example, the first relay 30 and the second relays 40 are connected in series via the busbars 20. The first relay 30 and the second relays 40 are, for example, connected to the load part and a power source disposed in the vehicle via the routing materials W connected to the aforementioned connectors 13 and can open and close power lines (routing materials W) between the load part and the power source.

The first relay 30 includes, for example, the terminals 32 and the body 31 including a moving contact, a fixed contact, a coil, and the like, which are not illustrated. The terminals 32 are, for example, disposed on a side surface of the body 31 and electrically and mechanically connected to the bus-bars 20 via the bolts 25. That is, while the first relay 30 is mounted on the first relay mounted portion 11*d* of the lower cover 11, the terminals 32 are connected to the busbars 20 via the bolts 25. The moving contact and the fixed contact are accommodated inside the body 31 together with the coil and electrically connected to the terminals 32. The coil is arranged, facing the moving contact, can move the moving contact by power supplied from the routing material W connected to one of the connectors 14 (see FIG. 4), which is different from the aforementioned connectors 13, and enables a switch between an energized state where the moving contact is into contact with the fixed contact and an interrupted state where the moving contact is into noncontact with the fixed contact. In specific, the moving contact moves toward the fixed contact side by the coil magnetized by energization and comes into contact with the fixed contact. On the other hand, if the coil is demagnetized, the moving contact moves to the side opposite to the side having the fixed contact by returning force of a spring or the like and comes into noncontact with the fixed contact.

The second relays 40 each include, for example, the body 41 including a moving contact, a fixed contact, a coil, and the like, which are not illustrated, and the tab terminals 42 protruding from the body 41. The tab terminals 42 are, for example, provided, protruding from the body 41 toward the other side (lower side) in the stacking direction X, and electrically and mechanically connected to the busbars 20 via so-called FF terminals 21 of the female-female type. That is, while the second relay 40 is mounted on the second relay mounted portion 12*d* of the upper cover 12, the tab terminals 42 pass through the openings 12*e* and are connected to the busbars 20 via the FF terminals 21. The moving contact and the fixed contact are accommodated inside the body 41 together with the coil and electrically connected to the tab terminals 42. Similar to the coil of the first relay 30, the coil can move the moving contact by power supplied from the routing material W connected to the other connector 14 (see FIG. 4), which is different from the aforementioned connectors 13, and enables a switch between an energized state where the moving contact is into contact with the fixed contact and an interrupted state where the moving contact is into noncontact with the fixed contact.

The busbars 20 are, for example, conductive members for connecting the first relay 30 and the second relays 40 in series. In this embodiment, a plurality of the busbars 20 are disposed on the busbar placed portion 11*c* at intervals therebetween. The busbars 20 electrically connect, for example, the connectors 13 and 14 to the first relay 30, the first relay 30 to the second relays 40, the second relay 40 to the second relay 40, the second relays 40 to the connectors 13 and 14, and the like. The busbars 20 are provided with the above-described FF terminals 21. The FF terminals 21 are female-female terminal fittings having two female sockets (terminals) that can be connected to male terminals of the busbars 20 and male tab terminals 42 of the second relays 40. The FF terminals 21 are provided to, for example, the busbars 20 connecting the first relay 30 to the second relays

40, the busbar 20 connecting the second relay 40 to the second relay 40, the busbars 20 connecting the second relays 40 to the connectors 13 and 14, and the like.

Figure 4:
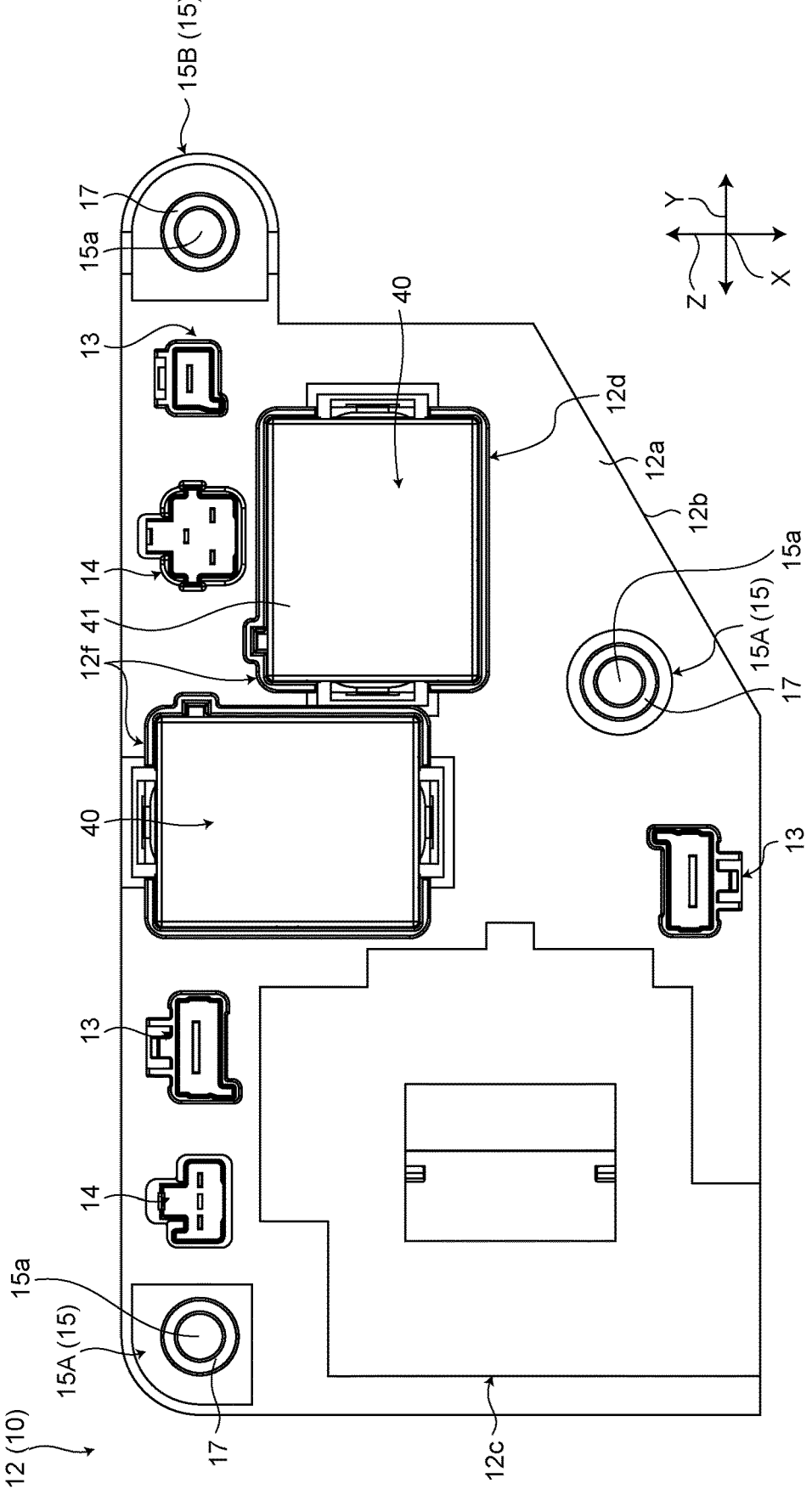
FIG. 4 is a plan view in which one side of an upper cover in a stacking direction according to the embodiment is exemplified.
Figure 5:
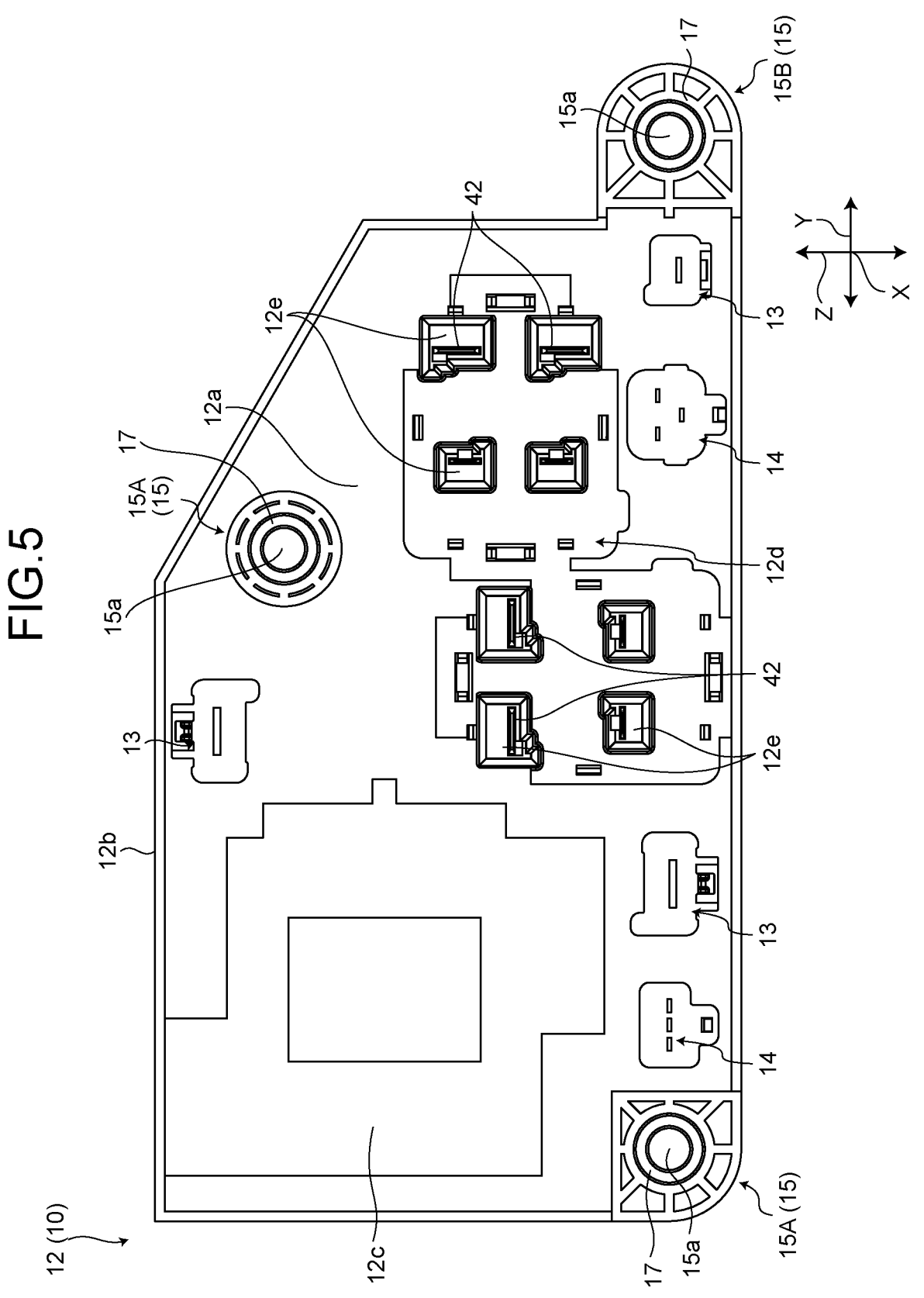
FIG. 5 is a plan view in which the other side of the upper cover in the stacking direction according to the embodiment is exemplified.

FIG. 4 is a plan view of one side (upper side) of the upper cover 12 in the stacking direction X, and FIG. 5 is a plan view of the other side (lower side) of the upper cover 12 in the stacking direction X. As illustrated in FIGS. 4 and 5, the upper cover 12 is provided with a plurality of fastened portions 15. At each of the fastened portions 15, a fixing member 16 (see FIG. 1) is fastened. In this embodiment, the fastened portions 15 include first fastened portions 15A and a second fastened portion 15B, and the fastened portions 15 including these first fastened portions 15A and second fastened portion 15B are arranged, surrounding the second relays 40.

In specific, the second fastened portion 15B is a portion, among the fastened portions 15, where the fixing member 16 for fixing the upper cover 12 (electrical connection box 1) to an attachment part on the vehicle side is fastened. The fixing member 16 is, for example, a bolt 16*a* (see FIG. 1) or the like. In this embodiment, the second fastened portion 15B is disposed at a first corner at one end in the width direction Y at one end in the depth direction Z of the upper cover 12. The second fastened portion 15B is provided, for example, protruding from the peripheral wall portion 12*b* of the upper cover 12 toward the one side in the width direction Y.

On the other hand, the first fastened portions 15A are portions, among the fastened portions 15, where the fixing members 16 for fastening the upper cover 12 and the lower cover 11 together are fastened. The fixing members 16 are, for example, bolts 16*a* and nuts 16*b* (see FIG. 1) or the like. In this embodiment, the first fastened portions 15A are disposed at two locations, a second corner at the other end in the width direction Y at the one end in the depth direction Z of the upper cover 12 and an approximate center in the width direction Y at the other end in the depth direction Z of the upper cover 12. With this configuration, in this embodiment, the three fastened portions 15 are arranged, in the upper cover 12, in a substantially triangular shape surrounding the periphery of the second relays 40.

The first fastened portions 15A and the second fastened portion 15B are each provided with a collar member 17. The collar members 17 are formed into cylindrical shapes (ring shapes) conforming to through holes 15*a* of the first fastened portions 15A and the second fastened portion 15B and fitted to inner circumferential surfaces of the through holes 15*a*. The collar members 17 function, for example, to prevent interference between the resin first fastened portions 15A and second fastened portion 15B and the metal fixing members 16 and to reinforce the strength of the connected portions between the first fastened portions 15A and second fastened portion 15B and the fixing members 16.

Figure 6:
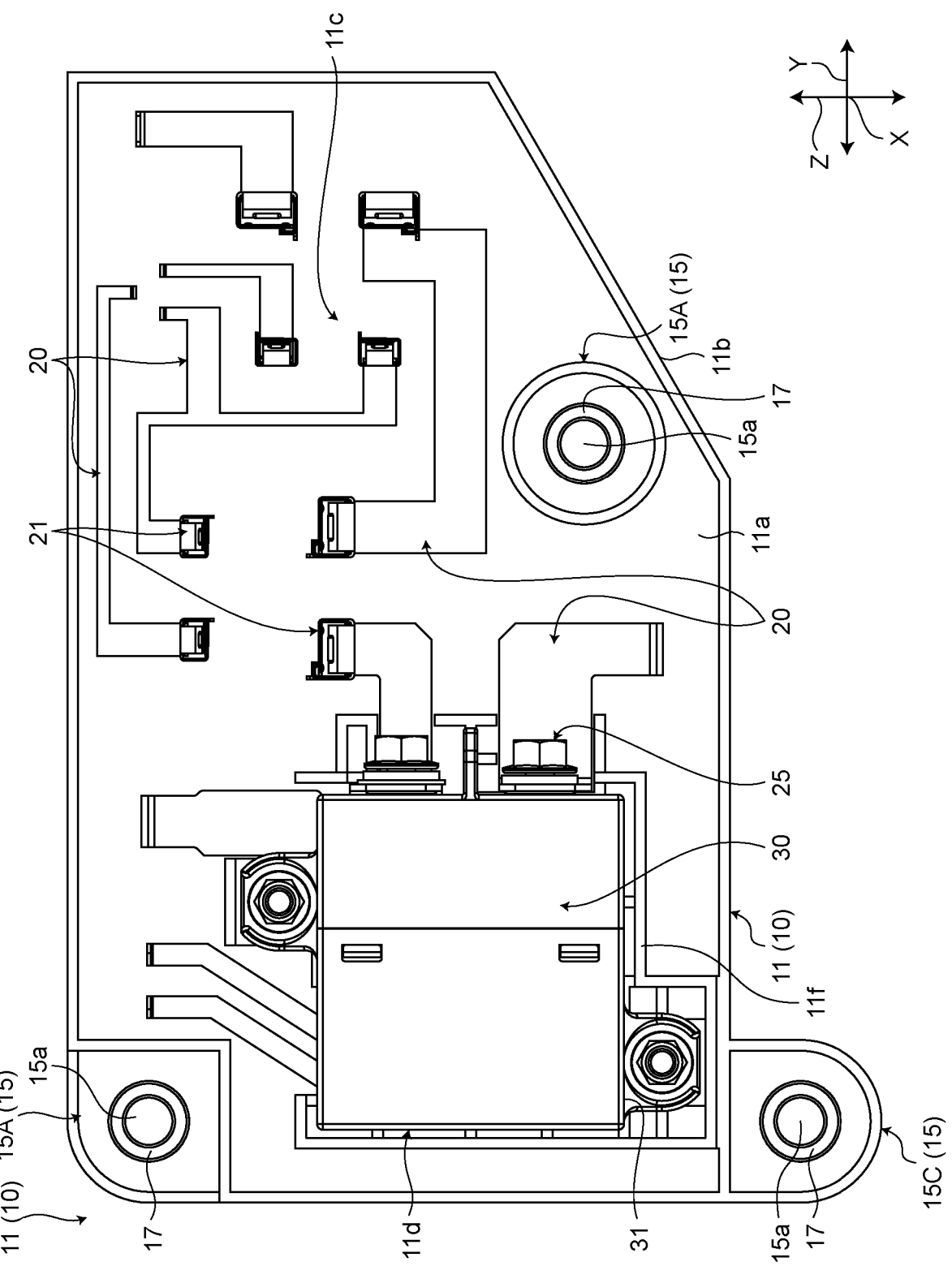
FIG. 6 is a plan view in which one side of a lower cover in the stacking direction according to the embodiment is exemplified.

FIG. 6 is a plan view of one side (upper side) of the lower cover 11 in the stacking direction X. As illustrated in FIG. 6, similar to the upper cover 12, the lower cover 11 is provided with a plurality of fastened portions 15. At each of the fastened portions 15, the fixing member 16 (see FIG. 1) is fastened. In this embodiment, the fastened portions 15 include first fastened portions 15A and a second fastened portion 15C, and the fastened portions 15 including these first fastened portions 15A and second fastened portion 15C are arranged, surrounding the first relay 30.

In specific, the second fastened portion 15C is a portion, among the fastened portions 15, where the fixing member 16 for fixing the lower cover 11 (electrical connection box 1) to an attachment part on the vehicle side is fastened. The fixing member 16 is, for example, a bolt 16*a* (see FIG. 1) or the like. In this embodiment, the second fastened portion 15C is disposed at a third corner at the other end in the width direction Y at the other end in the depth direction Z of the lower cover 11. In other words, the second fastened portion 15C is positioned diagonal to the second fastened portion 15B (see FIG. 4) of the upper cover 12. The second fastened portion 15C is provided, for example, protruding from the peripheral wall portion 11b of the lower cover 11 toward the other side in the depth direction Z.

On the other hand, the first fastened portions 15A are portions, among the fastened portions 15, where the fixing members 16 for fastening the lower cover 11 and the upper cover 12 together are fastened. The fixing members 16 are, for example, the bolts 16a and nuts 16b (see FIG. 1) or the like. In this embodiment, the first fastened portions 15A are disposed at two locations, a second corner at the other end in the width direction Y at the one end in the depth direction Z of the lower cover 11 and an approximate center in the width direction Y at the other end in the depth direction Z of the lower cover 11. In other words, the first fastened portions 15A are disposed in positions overlapping the first fastened portions 15A (see FIG. 4) of the upper cover 12 in the stacking direction X. With this configuration, in this embodiment, the three fastened portions 15 are arranged, in the lower cover 11, in a substantially triangular shape surrounding the first relay 30.

The first fastened portions 15A and the second fastened portion 15C are each provided with a collar member 17. The collar members 17 are formed into cylindrical shapes (ring shapes) conforming to through holes 15a of the first fastened portions 15A and the second fastened portion 15C and fitted to inner circumferential surfaces of the through holes 15a. The collar members 17 function, for example, to prevent interference between the resin first fastened portions 15A and second fastened portion 15C and the metal fixing members 16 and to reinforce the strength of the connected portions between the first fastened portions 15A and second fastened portion 15C and the fixing members 16.

Note that a case where the three fastened portions 15 are provided to each of the lower cover 11 and the upper cover 12 is exemplified in this embodiment; however, the number of the fastened portions 15 is not limited to this example, and, for example, four or more fastened portions 15 maybe provided to each of the lower cover 11 and the upper cover 12. Furthermore, the number of the second fastened portions 15B and 15C where the fixing members 16 fixing the electrical connection box 1 to the attachment parts on the vehicle side are fastened and the number of the first fastened portions 15A where the fixing members 16 fastening the lower cover 11 and the upper cover 12 together are fastened are not limited to this example, and various modifications can be made.

As described above, the electrical connection box 1 and the wire harness WH of this embodiment include the housing 10 configured by the lower cover 11 and the upper cover 12 stacked in the stacking direction X, the conductive busbars 20 assembled to the housing 10, the first relay 30 fastened to the busbars 20 via the bolts 25 and electrically connected to the busbars 20, and the second relays 40 including the tab terminals 42 protruding from the bodies 41 and electrically connected to the busbars 20. The lower cover 11 includes the busbar placed portion 11c where the busbars 20 are placed on the one side in the stacking direction X, and the first relay mounted portion 11d where the first relay 30 is mounted on the one side in the stacking direction X. The upper cover 12 includes the second relay mounted portion 12d that covers the one side in the stacking direction X of the busbars 20 placed on the busbar placed portion 11c, that mounts the second relays 40 on the one side in the stacking direction X, and that is provided with the openings 12e through which the tab terminals 42 pass toward the busbars 20, and the cover portion 12c covering the first relay 30 mounted on the first relay mounted portion 11d and the bolts 25.

With this configuration, the electrical connection box 1 and the wire harness WH can be configured so that, without providing a base plate (intermediate member) for attaching the electronic components, such as the busbars 20, the first relay 30, and the second relays 40, to the housing 10, the function of the base plate is distributed to the lower cover 11 and the upper cover 12. Thus, the electrical connection box 1 and the wire harness WH can reduce the number of components and hence can reduce time and cost required for manufacturing the electrical connection box 1 and the wire harness WH.

In the electrical connection box 1 and the wire harness WH of this embodiment, the lower cover 11 and the upper cover 12 are provided with the fastened portions 15 at each of which the fixing member 16 is fastened, and the fastened portions 15 are arranged, surrounding the first relay 30 in the lower cover 11 and surrounding the second relays 40 in the upper cover 12. With this configuration, the electrical connection box 1 and the wire harness WH can effectively support the load of the first relay 30 and the second relays 40 with the fastened portions 15 arranged, surrounding the peripheries of the first relay 30 and the second relays 40.

In the electrical connection box 1 and the wire harness WH of this embodiment, at least one of the fastened portions 15 in the lower cover 11 and at least one of the fastened portions 15 in the upper cover 12 are fastened together with the fixing member 16. With this configuration, the electrical connection box 1 and the wire harness WH can reduce the number of the fastened portions 15 fixed to the attachment parts of the vehicle or the like among the fastened portions 15 and hence can facilitate work of attaching the electrical connection box 1 and the wire harness WH.

The embodiments of the present invention have been exemplified above but are examples, and there is no intention of limiting the scope of the invention. The above embodiments can be implemented in various other forms, and various omissions, substitutions, combinations, and modifications can be made without departing from the gist of the invention. The specifications such as configurations and shapes (structure, type, direction, form, size, length, width, thickness, height, number, arrangement, position, material, and the like) can be changed as appropriate for implementation.

In the electrical connection box and the wire harness according to the present embodiment, the lower cover is provided with the busbar placed portion where the busbars are placed on the one side in the stacking direction and the first relay mounted portion where the first relay is mounted on the one side in the stacking direction, and the upper cover is provided with the second relay mounted portion that covers the one side in the stacking direction of the busbars placed on the busbar placed portion, that mounts the second relays on the one side in the stacking direction, and that is provided with the openings through which the tab terminals pass toward the busbars, and the cover portion covering the first relay mounted on the first relay mounted portion and the bolts. With this configuration, the electrical connection box and the wire harness can be configured so that the configuration for attaching the electronic components, such as the busbars, the first relay, and the second relays, to the housing is distributed to the lower cover and the upper cover. Thus, the electrical connection box and the wire harness achieve effect of reducing the number of components.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:

a housing configured by a lower cover and an upper cover stacked in a stacking direction;

a busbar assembled to the housing and having conductivity;

a first relay fastened to the busbar via a bolt and configured to be electrically connected to the busbar; and a second relay including a tab terminal protruding from a body of the second relay, the tab terminal being configured to be electrically connected to the busbar, the lower cover including a busbar placed portion and a first relay mounted portion, the busbar being placed on one side in the stacking direction at the busbar placed portion, the first relay being mounted on the one side in the stacking direction at the first relay mounted portion, and the upper cover including a second relay mounted portion and a cover portion, the second relay mounted portion covering the one side in the stacking direction of the busbar placed on the busbar placed portion, mounting the second relay on the one side in the stacking direction, and being provided with an opening, the tab terminal passing through the opening toward the busbar, the cover portion covering the first relay mounted on the first relay mounted portion and the bolt.

2. The electrical connection box according to claim 1, wherein the lower cover and the upper cover are provided with a plurality of fastened portions, a fixing member is fastened at each of the fastened portions, and the plurality of fastened portions are arranged, surrounding the first relay in the lower cover and surrounding the second relay in the upper cover.

3. The electrical connection box according to claim 2, wherein at least one of the fastened portions in the lower cover and at least one of the fastened portions in the upper cover are fastened together with the fixing member.

4. A wire harness comprising:

a routing material having conductivity; and an electrical connection box configured to be electrically connected to the routing material, the electrical connection box including:

a housing configured by a lower cover and an upper cover stacked in a stacking direction;

a busbar assembled to the housing and having conductivity;

a first relay fastened to the busbar via a bolt and configured to be electrically connected to the busbar; and a second relay including a tab terminal protruding from a body of the second relay, the tab terminal being configured to be electrically connected to the busbar, the lower cover including a busbar placed portion and a first relay mounted portion, the busbar being placed on one side in the stacking direction at the busbar placed portion, the first relay being mounted on the one side in the stacking direction at the first relay mounted portion, and the upper cover including a second relay mounted portion and a cover portion, the second relay mounted portion covering the one side in the stacking direction of the busbar placed on the busbar placed portion, mounting the second relay on the one side in the stacking direction, and being provided with an opening, the tab terminal passing through the opening toward the busbar, the cover portion covering the first relay mounted on the first relay mounted portion and the bolt.

* * * * *